US008672418B2

(12) United States Patent
Harada et al.

(10) Patent No.: US 8,672,418 B2
(45) Date of Patent: Mar. 18, 2014

(54) SEALING STRUCTURE FOR PISTON AND PISTON PUMP AND BRAKE HYDRAULIC PRESSURE CONTROL DEVICE INCORPORATING THE STRUCTURE

(75) Inventors: Tomoo Harada, Anjo (JP); Tsunekazu Nishida, Nagoya (JP)

(73) Assignee: Advics Co., Ltd, Kariya, Aichi-Pref. (JP)

( * ) Notice: Subject to any disclaimer, the term of this patent is extended or adjusted under 35 U.S.C. 154(b) by 148 days.

(21) Appl. No.: 12/945,302

(22) Filed: Nov. 12, 2010

(65) Prior Publication Data

US 2011/0115283 A1    May 19, 2011

(30) Foreign Application Priority Data

Nov. 19, 2009    (JP) ................................. 2009-264390

(51) Int. Cl.
  *B60T 13/18*    (2006.01)
(52) U.S. Cl.
  USPC ............ 303/11; 303/10; 303/116.4; 417/471; 417/549; 417/554; 277/589
(58) Field of Classification Search
  USPC ........... 303/10, 11, 116.4; 277/434, 584, 589; 417/470, 471, 549, 554
  See application file for complete search history.

(56) References Cited

U.S. PATENT DOCUMENTS

| | | | | |
|---|---|---|---|---|
| 3,149,848 A | * | 9/1964 | Galloway | 277/468 |
| 3,328,041 A | * | 6/1967 | Bloom et al. | 277/468 |
| 3,663,024 A | * | 5/1972 | Traub | 277/589 |
| 4,151,999 A | * | 5/1979 | Ringel et al. | 277/589 |
| 4,239,244 A | * | 12/1980 | Brent | 277/584 |
| 4,577,874 A | * | 3/1986 | Zitting | 277/584 |

(Continued)

FOREIGN PATENT DOCUMENTS

| | | |
|---|---|---|
| DE | 10 2004 010 498 A1 | 10/2004 |
| JP | 57-182661 U | 11/1982 |

(Continued)

OTHER PUBLICATIONS

Office Action (Notice of Rejection Reasons) dated Jan. 31, 2012, issued by the Japanese Patent Office in the corresponding Japanese Patent Application No. 2009-264390 and an English Translation of Office Action. (11 pages).

*Primary Examiner* — Thomas J Williams
*Assistant Examiner* — Mariano Sy
(74) *Attorney, Agent, or Firm* — Buchanan Ingersoll & Rooney PC

(57) ABSTRACT

A sealing structure is provided wherein an annular groove formed in a pump cylinder of a piston pump receives therein a seal ring made of a synthetic resin material and having an inner circumferential surface fluid-tightly contacting an outer circumferential surface of the pump piston and an O-ring arranged on the outer circumferential side of the seal ring and urging the seal ring radially inward. The seal ring is formed at its axial end portions with flange portions for preventing the O-ring from coming off. In the state that the seal ring and the O-ring are fitted in the annular groove, the flange portions do not receive a load from the O-ring, and a surface pressure which the seal ring applies to the outer circumferential surface of the piston at an axial center portion thereof is set to be higher than surface pressures which it applies to the outer circumferential surface of the piston at axial end portions thereof.

14 Claims, 9 Drawing Sheets

(56) References Cited

U.S. PATENT DOCUMENTS

| | | | | |
|---|---|---|---|---|
| 5,143,382 | A | * | 9/1992 | Maringer ................. 277/584 |
| 5,232,273 | A | * | 8/1993 | Eckstein et al. .......... 303/116.4 |
| 5,374,168 | A | * | 12/1994 | Kozawa et al. ............. 417/471 |
| 5,692,758 | A | * | 12/1997 | Wikstrom .................. 277/591 |
| 6,042,350 | A | * | 3/2000 | Beck ........................ 417/549 |
| 6,514,056 | B1 | * | 2/2003 | Schuller et al. ............ 417/549 |
| 7,704,058 | B2 | * | 4/2010 | Harada et al. ............. 417/549 |
| 2004/0258547 | A1 | | 12/2004 | Burger et al. |
| 2008/0069709 | A1 | | 3/2008 | Burger et al. |
| 2008/0206081 | A1 | | 8/2008 | Harada |

FOREIGN PATENT DOCUMENTS

| | | | |
|---|---|---|---|
| JP | 01-174676 U | | 12/1989 |
| JP | 4-062964 U | | 5/1992 |
| JP | 2001-280220 A | | 10/2001 |
| JP | 4081800 B2 | | 4/2008 |
| JP | 2008-208788 A | | 9/2008 |
| JP | 2009-062995 A | | 3/2009 |
| JP | 2009-216150 A | | 9/2009 |
| JP | 2009-222180 A | | 10/2009 |
| JP | 2009222180 A | * | 10/2009 |

* cited by examiner

SEALING STRUCTURE FOR PISTON AND PISTON PUMP AND BRAKE HYDRAULIC PRESSURE CONTROL DEVICE INCORPORATING THE STRUCTURE

INCORPORATION BY REFERENCE

This application is based on and claims priority under 35 U.S.C. 119 with respect to Japanese Application No. 2009-264390 filed on Nov. 19, 2009, the entire content of which is incorporated herein by reference.

BACKGROUND OF THE INVENTION

1. Field of the Invention

The present invention relates to a sealing structure for a piston which axially reciprocates in a cylinder, and further to a piston pump and a brake hydraulic pressure control device each incorporating the sealing structure.

2. Discussion of the Related Art

As sealing structures of this kind, there has been known one wherein a seal member made of a synthetic resin material which is pressed radially outward by an O-ring is provided in an annular groove formed on an outer circumferential surface of a shaft member (refer to Japanese Patent No. 4081800 B2 for example). In this structure, an urging force of the O-ring serves to perform a sealing function between an outer circumferential surface of the seal member and an internal surface of the cylinder in which the shaft member is fitted.

In the known sealing structure, peak regions in surface pressure (i.e., contact force or strength per area) against the internal surface of the cylinder are formed at two axially spaced places on the outer circumferential surface of the seal member. Thus, in the Japanese patent, it is mentioned that the posture of the seal member relative to the cylinder can be stabled, so that it is possible for the plurality of sealing portions (i.e., the aforementioned peak regions) to enhance the sealing performance between the shaft member and the cylinder.

The inventors of the present application found out the following problem in the sealing structure disclosed in the Japanese patent wherein a seal member performs a sealing function at axial end portions thereof. That is, the sealing performance becomes insufficient in a certain situation. When the shaft member axially reciprocates in the cylinder, it occurs that the posture of the seal member changes repeatedly in dependence on the moving direction of the shaft member. In this case, because the peak regions of the sealing surface pressure (hereafter referred to as seal portions) are formed at plural places spaced axially on the sliding surface, the surface pressures at the respective seal portions change alternately in dependence on the change in the posture of the seal member. Thus, the thicknesses of oil films at the respective seal portions are changed by the changes in the surface pressures, and this may result in that the fluid in a closed chamber is gradually drawn out to the exterior (this is called a pumping phenomenon).

More in detail, when the shaft member first moves in a positive-going direction, the change in the posture of the seal member occurs which causes the fluid in the closed chamber to leak from one seal portion being lowered in the surface pressure, and the leaked fluid enters a space between both of the seal portions. Then, when the posture of the seal member changes in the reverse direction in the return movement of the shaft member, the fluid which entered the space between both of the seal portions leaks this time from the other seal portion lowed in the surface pressured to be discharged outside.

In particular, in a sealing structure wherein a seal member pressed by an O-ring radially inward is provided in an annular groove formed in a cylinder and wherein flanges for preventing the coming-off of the O-ring are formed at axial end portions on the outer circumferential surface of the seal member, the O-ring presses either of the flanges in the axial reciprocation movements of the shaft member, and this makes the posture of the seal member further unstable. Further, where a high hydraulic pressure is being generated in a closed chamber as is the case of a hydraulic pump, the high hydraulic pressure in the closed chamber contributes to the change in the posture of the seal member, so that the aforementioned pumping phenomenon becomes remarkable.

By the way, in recent years, a vehicle brake hydraulic pressure control device is being used for controls in a wide range which include not only controls such as a so-called antiskid control, vehicle stability control (side slip control) and the like, but also controls such as brake force assist control or automatic brake control in the case of travelling to follow a vehicle ahead. With this, the vehicle brake hydraulic pressure control device is remarkably increasing in the number of operation times and the operation period of time. Where the number of operation times and the operation period of time increase, the chances for a piston pump to operate in the device also increase, so that there arises an apprehension that the chances for brake fluid to leak outside of the pump form a sliding portion (sealing portion) between a piston and a cylinder receiving the piston therein also increase. Thus, it becomes a problem to reduce the leak quantity of brake fluid as little as possible as a measure against such an apprehension.

Under these circumstances, a prior art piston pump wherein the sealing between a piston and a cylinder is carried out by the use of only a seal member made of a rubber material (e.g., one that is configured by removing a seal ring 11 made of a synthetic resin material from a piston pump shown in FIG. 2 and that uses an O-ring 12 as seal member) is accompanied by an apprehension that the wear and the scraping of the rubber part forming a sliding portion increase to the extent that is unable to neglect, with increases in the number of operation times and the operation period of time in the brake hydraulic pressure control device, and this gives rise to a problem in reducing the leak of brake fluid.

There has been known another piston pump in which a coating which smoothens the surfaces of a piston and a cylinder is carried out in order to prevent the wear and scraping of the rubber part (e.g., US2008/0069709 A1 equivalent of DE102004010498 A1). In this device, an apprehension arises in that the exfoliation of a coated layer takes place with increases in the number of operation times and the operation period of time.

SUMMARY OF THE INVENTION

Accordingly, it is a primary object of the present invention to provide a sealing structure for a piston which is capable of enhancing a sealing performance in a construction that a piston is axially reciprocatable in a cylinder, and also to provide a piston pump and a brake hydraulic pressure control device each incorporating the sealing structure.

Briefly, according to the present invention in a first aspect, there is provided an improved sealing structure for a piston which is reciprocatable in an axial direction in a cylinder extending in the axial direction with an annular groove formed on one of the cylinder and an outer circumferential surface of the piston. The structure comprises a seal member made of a synthetic resin material to an annular shape and fitted in the annular groove so that a seal surface formed on an inner or outer circumferential surface thereof contacts the other of the cylinder and the outer circumferential surface of the piston for fluid-tightly sealing a fitting portion between the piston and the cylinder; a pressing member arranged on an outer or inner circumferential side of the seal member in the annular groove for urging a center portion in the axial direction of the seal member toward the cylinder or the outer circumferential surface of the piston; and an engaging portion formed on at least one end portion in the axial direction of the seal member and radially protruding for preventing the seal member from separating from the pressing member in assembling the pressing member and the seal member. The engaging portion is configured not to receive a load from the pressing member in the state that the pressing member and the seal member are fitted in the annular groove, and a surface pressure which the seal member applies to the cylinder or the outer circumferential surface of the piston at an axial center portion thereof is higher than surface pressures which the seal member applies to the cylinder or the outer circumferential surface of the piston at axial end portions thereof.

With the construction in the first aspect, the pressing member urges the center portion in the axial direction of the seal member toward the cylinder or the outer circumferential surface of the piston. The engaging portion is configured not to receive a load from the pressing member in the state that the pressing member and the seal member are fitted in the annular groove, and the surface pressure which the seal member applies to the cylinder or the outer circumferential surface of the piston at the axial center portion thereof is higher than the surface pressures which the seal member applies to the cylinder or the outer circumferential surface of the piston at the axial end portions thereof. Thus, the sealing function is performed at one place in the axial direction of the seal member. Accordingly, regardless of whether the piston is reciprocating or not, it does not occur that the fluid in the hydraulic pressure chamber is drawn out, so that the sealing performance can be enhanced.

Further, since the seal member performs the sealing function at the center portion thereof in the axial direction, the reciprocation movement of the piston hardly changes the posture at the sealing portion, so that the surface pressure on the seal member can be prevented from being lowered by the cause of a change in the posture of the seal member. That is, the sealing structure of the present invention in the first aspect is free of the pumping phenomenon which occurs in the prior art pump as referred to in the aforementioned Japanese patent, and can be further improved in the sealing performance.

Further, with the construction in the first aspect, since the seal member is made of the synthetic resin material being smaller in frictional resistance, it is possible to make large an interference of the seal member on the cylinder or piston and to increase the surface pressure without an apprehension that the seal member surfers from being scraped or the like. Thus, it can be realized to extend the service life of the sealing structure.

The present invention in a second aspect provides a piston pump which comprises a housing formed with a pump cylinder extending in an axial direction; a pump piston fluid-tightly reciprocatable in the pump cylinder; a pump chamber formed between one end portion of the pump piston and a bottom portion of the pump cylinder and communicating with a discharge port for hydraulic pressure; a supply chamber formed between an outer circumference of the pump piston and the housing and communicating with a suction port for hydraulic pressure; a pump valve provided on the pump piston for being usually in a closed state but for being brought by hydraulic pressure from the supply chamber into an open state to communicate the pump chamber with the supply chamber; an eccentric cam contacting the other end portion of the pump piston for moving the pump piston toward the pump chamber when rotated; an urging member engaged with the pump piston for urging the pump piston toward the eccentric cam; and an annular groove located between the supply chamber and an exterior to which the other end portion of the pump piston is exposed, and provided on one of the pump cylinder and the outer circumference of the pump piston. The piston pump further includes the sealing structure configured as set forth in the first aspect and provided in the annular groove.

According to the piston pump in the second aspect, since the annular groove located between the supply chamber and the exterior to which the other end portion of the pump piston is exposed is formed on one of the pump cylinder and the outer circumferential surface of the pump piston, and since the sealing structure for a piston of the character as set forth in the first aspect is provided in the annular groove, it does not occur regardless of whether the pump piston is reciprocating or not that the fluid in the supply chamber is drawn out to the exterior, and thus, the performance for sealing the supply chamber against the exterior of the piston pump can be enhanced.

The present invention in a third aspect provides a brake hydraulic pressure control device which has a plurality of control valves for regulating hydraulic pressure supplied to at least one brake wheel cylinder for at least one wheel; and a piston pump for boosting hydraulic pressure supplied to the at least one brake wheel cylinder. The piston pump comprises a cylinder extending in an axial direction; a piston reciprocatable in the axial direction in the cylinder; an annular groove formed on one of the cylinder and an outer circumferential surface of the piston; and a sealing structure. The sealing structure comprises a seal member made of a synthetic resin material to an annular shape and fitted in the annular groove so that a seal surface formed on an inner or outer circumferential surface thereof contacts the other of the cylinder and the outer circumferential surface of the piston for fluid-tightly sealing a fitting portion between the piston and the cylinder; and a pressing member arranged on an outer or inner circumferential side of the seal member in the annular groove for urging a center portion in the axial direction of the seal member toward the cylinder or the outer circumferential surface of the piston.

According to the brake hydraulic pressure control device in the third aspect, the piston pump is provided with the sealing structure which is arranged in the annular groove formed on one of the cylinder and the outer circumferential surface of the piston, and the sealing structure comprises the seal member made of the synthetic resin material to the annular shape and contacts the other of the cylinder and the outer circumferential surface of the piston at the seal surface formed on the inner or outer circumferential surface thereof for fluid-tightly sealing the fitting portion between the piston and the cylinder and the pressing member arranged on the outer or inner circumferential side of the seal member for urging the center portion in the axial direction of the seal member toward the cylinder or the outer circumferential surface of the piston. Therefore, regardless of whether the piston is reciprocating or not, it does not take place that the seal member surfers from being worn, scraped or the like, and hence, it can be realized to extend the service life of the sealing structure.

Further, since the seal member made of the synthetic resin material is urged by the pressing member to be pressed properly on the piston or the cylinder, it is possible to remarkably decrease the leak quantity of brake fluid.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

Figure 1:
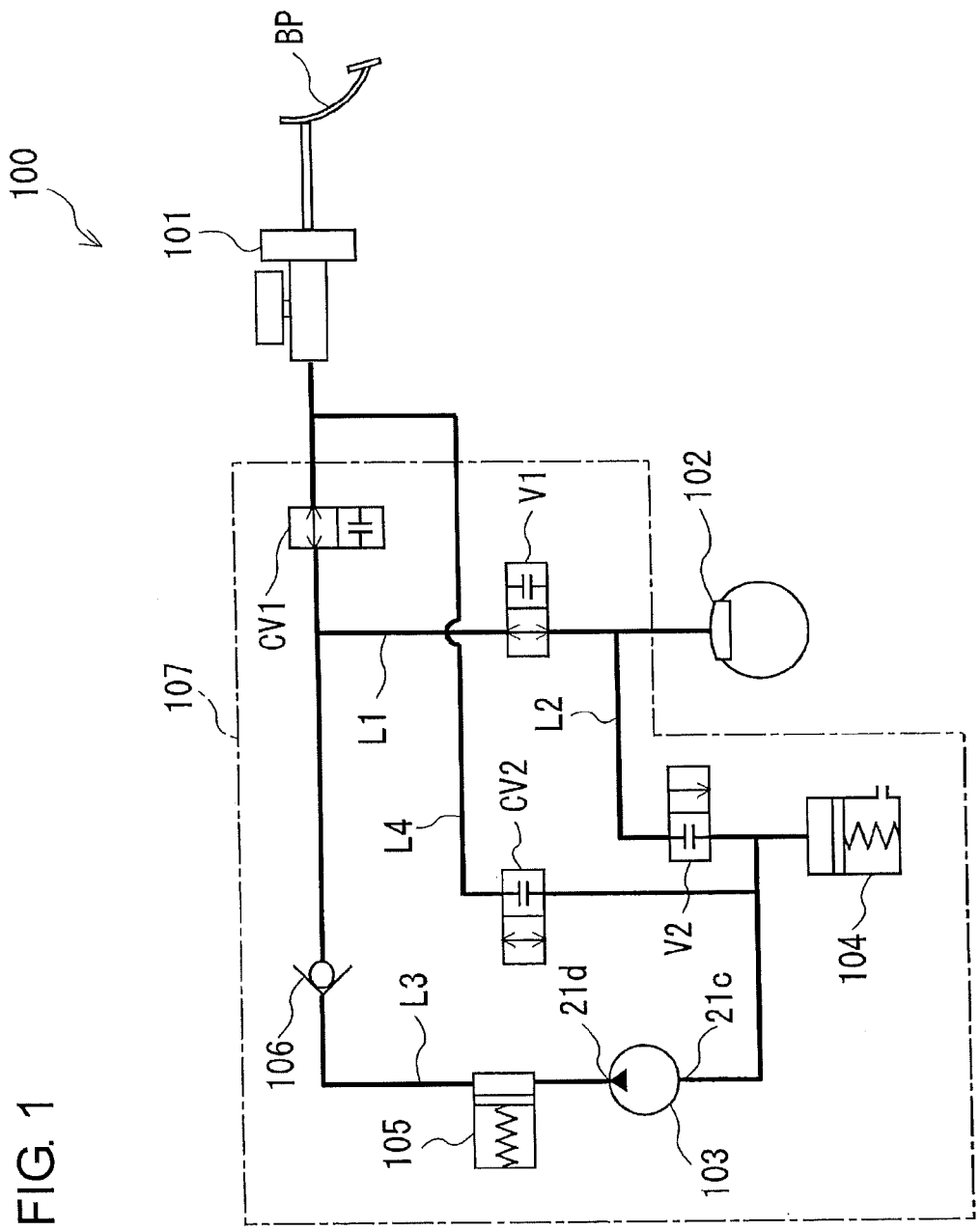
FIG. 1 is a hydraulic circuit diagram of a brake hydraulic pressure control device incorporating a piston pump in each of embodiments and modified forms thereof according to the present invention.

Hereafter, a brake hydraulic pressure control device 100 incorporating a piston pump 103 in a first embodiment according to the present invention will be described with reference to FIG. 1. FIG. 1 shows the brake hydraulic pressure control device 100, which is equipped on a vehicle, and the brake hydraulic pressure control device 100 is configured to be able to perform an antiskid control, a traction control, a vehicle stability control and the like in addition to an ordinary braking operation.

A master cylinder 101 is attached in an engine room (not shown) of the vehicle and is connected to a brake pedal BP. When the driver manipulates the brake pedal BP, the master cylinder 101 is able to generate a brake hydraulic pressure.

The master cylinder 101 is connected by a main pipe conduit L1 to a wheel cylinder 102 (corresponding to at least one brake wheel cylinder in the claimed invention). The wheel cylinder 102 is attached for a wheel and applies a brake force to the wheel when supplied with a brake hydraulic pressure from the master cylinder 101. Obviously, FIG. 1 typically illustrates only one wheel cylinder 102 of those wheel cylinders which are provided for four wheels as well known in the art. As well known in the art and for brevity in description and illustration, the following description will be made regarding the one wheel cylinder 102 and a hydraulic circuit arrangement therefor. However, it is to be noted that the hydraulic circuit arrangement similar to that shown in FIG. 1 are provided for other remaining wheel cylinders (not shown).

The main pipe conduit L1 is provided thereon with a pressure increase valve V1 (corresponding to one of the control valves in the claimed invention). The pressure increase valve V1 is a normally-open electromagnetic valve and remains in an open state during an ordinary braking. The wheel cylinder 102 is connected to a suction port 21c of the piston pump 103 through a circulation conduit L2. Further, a discharge port 21d of the piston pump 103 is connected to the master cylinder 101 through a return conduit L3. A reservoir device 104 is provided on the circulation conduit L2. Further, a pressure reducing valve V2 (corresponding to one of the control valves in the claimed invention) is provided between the wheel cylinder 102 and the reservoir device 104 on the circulation conduit L2. The reducing valve V2 is a normally-closed electromagnetic valve and is held in a closed state during an ordinary braking to block the communication between the wheel cylinder 102 and the reservoir device 104.

When the brake hydraulic pressure control device 100 is in an antiskid control state, the pressure increase valve V1 is appropriately brought into a closed state to block the communication between the master cylinder 101 and the wheel cylinder 102. Further, when the brake hydraulic pressure in the wheel cylinder 102 is to be reduced, the pressure reducing valve V2 is brought into an open state to bring the wheel cylinder 102 and the reservoir device 104 into communication, so that the brake hydraulic pressure in the wheel cylinder 102 is discharged to the reservoir device 104. In this way, the pressure increase valve V1 and the pressure reducing valve V2 regulate the brake hydraulic pressure supplied to the wheel cylinder 102.

The piston pump 103 is driven by an electric motor (not shown) and draws the brake fluid discharged into the reservoir device 104 to flow it back to the master cylinder 101. A damper 105 is provided on the return conduit L3 and reduces the pulsation in the hydraulic pressure caused by the operation of the piston pump 103. Further, a check valve 106 is provided between the damper 105 and the master cylinder 101 on the return conduit L3 and prevents brake fluid from flowing in the direction from the master cylinder 101 toward the damper 105.

A first cut valve CV1 being a normally-open electromagnetic valve is provided between the master cylinder 101 and the pressure increase valve V1 on the main pipe conduit L1. Further, a suction conduit L4 is connected at its one end to between the master cylinder 101 and the first cut valve CV1 on the main pipe conduit L1 and is also connected at its other end to between the suction port 21c of the piston pump 103 and the pressure reducing valve V2 on the circulation conduit L2. A second cut valve CV2 being a normally-closed electromagnetic valve is provided on the suction conduit L4.

The piston pump 103, the reservoir device 104, the damper 105, the check valve 106, the pressure increase valve V1, the pressure reducing valve V2, the first cut valve CV1, and the second cut valve CV2 which are all aforementioned are integrated or united to constitute a hydraulic pressure control unit 107.

When the aforementioned brake hydraulic pressure control device 100 performs a traction control, a vehicle stability control or the like, the first cut valve CV1 and the second cut valve CV2 are brought respectively into the closed state and the open state, in which state the piston pump 103 draws the brake fluid in the master cylinder 101 through the suction conduit L4 and the second cut valve CV2 and supplies the drawn brake fluid to the wheel cylinder 102. In this case, regardless of whether the brake pedal BP is being manipulated or not, the piston pump 103 raises the pressure of the brake fluid and supplies the same to the wheel cylinder 102. The piston pump 103 may be provided in a brake hydraulic pressure circuit of a brake-by-wire type.

Next, the piston pump 103 incorporating a sealing structure 1 in the first embodiment will be described with reference to FIGS. 2 to 6. Hereafter, unless specified otherwise, the right side and left side in FIGS. 2 and 3 will be described as right and left, respectively. It is to be noted that the orientation of the piston pump 103 shown in FIGS. 2 and 3 does not necessarily represent the state in which it is actually equipped on a vehicle.

Figure 2:
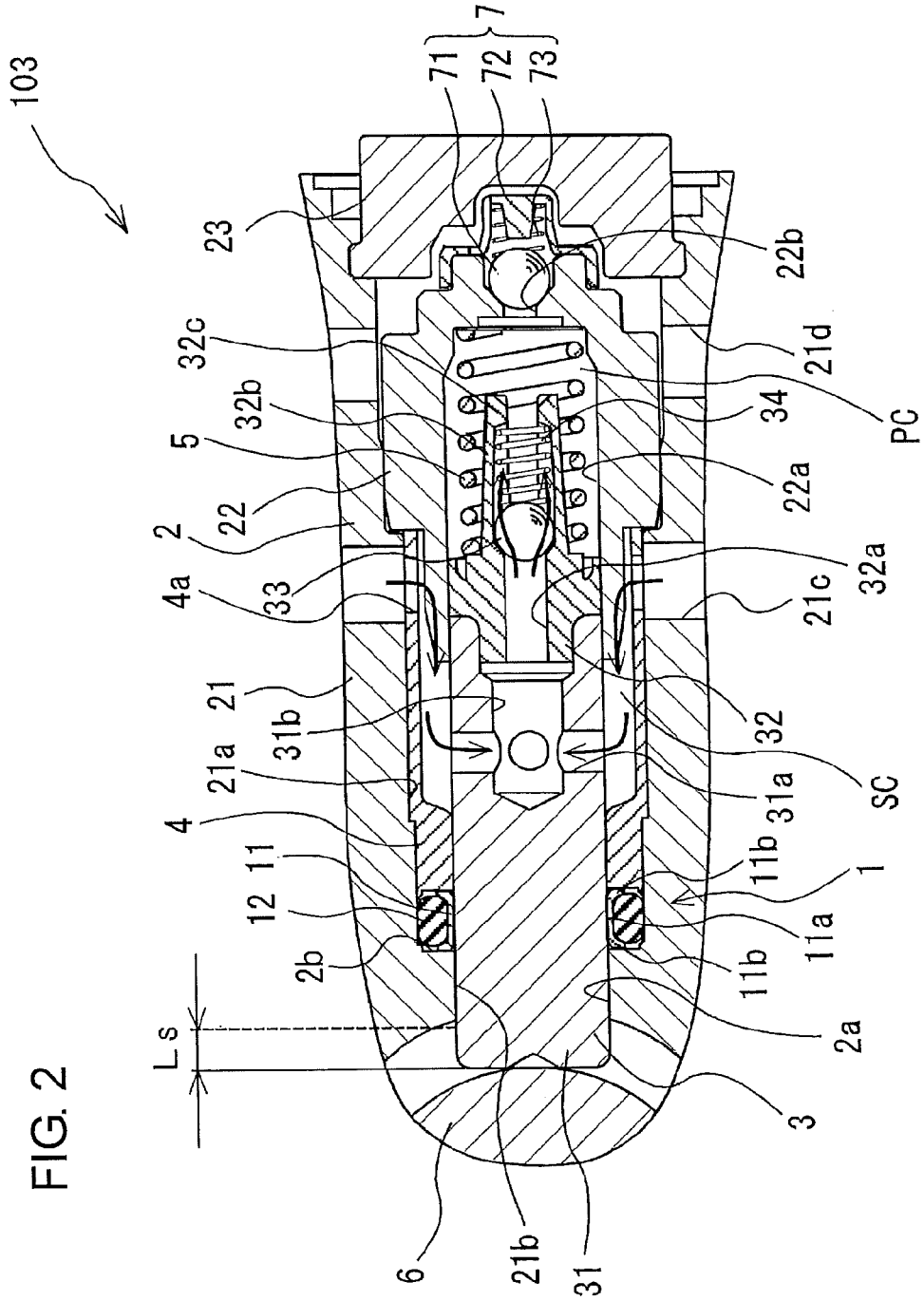
FIG. 2 is a fragmentary, longitudinal sectional view of the piston pump shown in FIG. 1.

FIG. 2 is a sectional view at the suction stage of the piston pump 103 which is used in a brake hydraulic pressure control device such as, for example, antiskid control device, traction control device or vehicle stability control device for a vehicle, though not to be limited thereto. In the piston pump 103, a housing 2 made of an aluminum alloy is provided therein with a pump piston 3 being able to reciprocate in the axial direction.

The housing 2 is composed of a pump body 21, a housing piece 22 fitted and secured in an internal bore 21a formed in the pump body 21, and a cap 23 closing an open end of the internal bore 21a.

The pump body 21 is formed therein with a first pump cylinder bore 21b extending in the axial direction. Further, the housing piece 22 is also formed therein with a second pump cylinder bore 22a extending in the axial direction. In this particular embodiment, the first pump cylinder bore 21b and the second pump cylinder bore 22a are formed to be the same in diameter. Hereafter, the first pump cylinder bore 21b and the second pump cylinder bore 22a will collectively be referred to as a pump cylinder 2a (corresponding to the cylinder in the claimed invention). An annular recess or groove 2b is formed on the first pump cylinder bore 21b and is provided therein with the sealing structure 1 as referred to later in detail (which corresponds to the sealing structure for a piston in the claimed invention).

The pump piston 3 (corresponding to the piston in the claimed invention) is formed to have a valve seat 32 connected at the right end of a piston body 31 which is arranged at the left side as viewed in FIG. 2. The outer circumferential surface of the piston body 31 is fluid-tightly fitted in the first pump cylinder bore 21b owing to the function of the sealing structure 1. Further, the outer circumferential surfaces of the piston body 31 and the valve seat 32 are fluid-tightly fitted in the second pump cylinder bore 22a. Thus, the pump piston 3 is able to reciprocate fluid-tightly in the pump cylinder 2a.

An approximately annular supply chamber SC (corresponding to the suction region in the claimed invention) is formed between the outer circumferential surface of the piston body 31 and the internal surface 21a of the pump body 21. The supply chamber SC is fluid-tightly sealed by the sealing structure 1 at the left end thereof in the axial direction and is fluid-tightly sealed at the right end thereof in the axial direction through the fitting engagement of the piston body 31 and the valve seat 32 with the second pump cylinder bore 22a. The supply chamber SC communicates with suction holes 21c (corresponding to the suction port in the claimed invention) formed in the pump body 21 and is able to be supplied with brake fluid from the reservoir device 104 through the suction holes 21c.

On the other hand, a pump chamber PC is formed between a right end surface (corresponding to one end side of the piston pump in the claimed invention) of the valve seat 32 and a bottom portion of the second pump cylinder bore 22a. The pump chamber PC communicates with discharge holes 21d (corresponding to the discharge port in the claimed invention) formed in the pump body 21 and is able to discharge high-pressure brake fluid outside through the discharge holes 21d.

The piston body 31 is formed with a plurality of connection holes 31a opening to the supply chamber SC. The connection holes 31a are connected to a valve hole 32a formed in the valve seat 32, through a transverse hole 31b which extends in the axial direction in the interior of the piston body 31. The valve hole 32a opens to the pump chamber PC, and a spherical valve body 33 (corresponding to the pump valve in the claimed invention) is arranged at the opening portion.

The valve seat 32 is formed with a plurality of spring retainers 32b which protrude toward the right as viewed in FIG. 2. Right ends of the respective spring retainers 32b protrude hook portions 32c radially inward, and a valve spring 34 is interposed in a compressed state between the hook portions 32c and the valve body 33.

The valve body 33 is usually held in a closed state by the urging force of the valve spring 34, but is brought into an open state by being separated from the valve seat 32 by the hydraulic pressure from the supply chamber SC, to make communication between the pump chamber PC and the supply chamber SC.

In the supply chamber SC, there is provided a seal retainer 4 for arranging the sealing structure 1. The seal retainer 4 takes an approximately cylindrical shape, and the axial position thereof is restrained by the pump body 21 and the housing piece 22. The internal surface at the left end portion of the seal retainer 4 forms a part of the first pump cylinder bore 21b and allows the pump piston 3 to reciprocate therein. A plurality of communication holes 4a are formed in the seal retainer 4 and connect the suction holes 21c with the supply chamber SC.

A return spring 5 (corresponding to the urging member in the claimed invention) is interposed in a compressed state between the valve seat 32 and the second pump cylinder bore 22a. The return spring 5 usually urges the pump piston 3 toward the left (toward an eccentric cam 6 referred to later).

Further, the eccentric cam 6 is provided to contact the left end of the pump piston 3 (corresponding to the other end side of the pump piston in the claimed invention) which end is exposed to the exterior (corresponding to the atmospheric region in the claimed invention). When rotated, the eccentric cam 6 alternately repeats protruding the outer circumferential surface toward the right and retracting its toward the left.

The housing piece 22 is formed at its bottom portion with a through hole 22b communicating with the pump chamber PC. A discharge valve 7 is formed at an opening portion at the right end of the through hole 22b. The discharge valve 7 is composed of a ball valve 71 for closing the opening portion of the through hole 22b, a retainer 72 attached to the right end of the housing piece 22, and a valve spring 73 interposed in a compressed state between the ball valve 71 and the retainer 72.

The discharge valve 7 is normally held in a closed state with the ball valve 71 being urged by the valve spring 73 and air-tightly closes the pump chamber PC in cooperation with the valve body 33. The discharge valve 7 is brought by the hydraulic pressure from the pump chamber PC into an open state to make a communication of the pump chamber PC with the discharge holes 21d.

Figure 3:
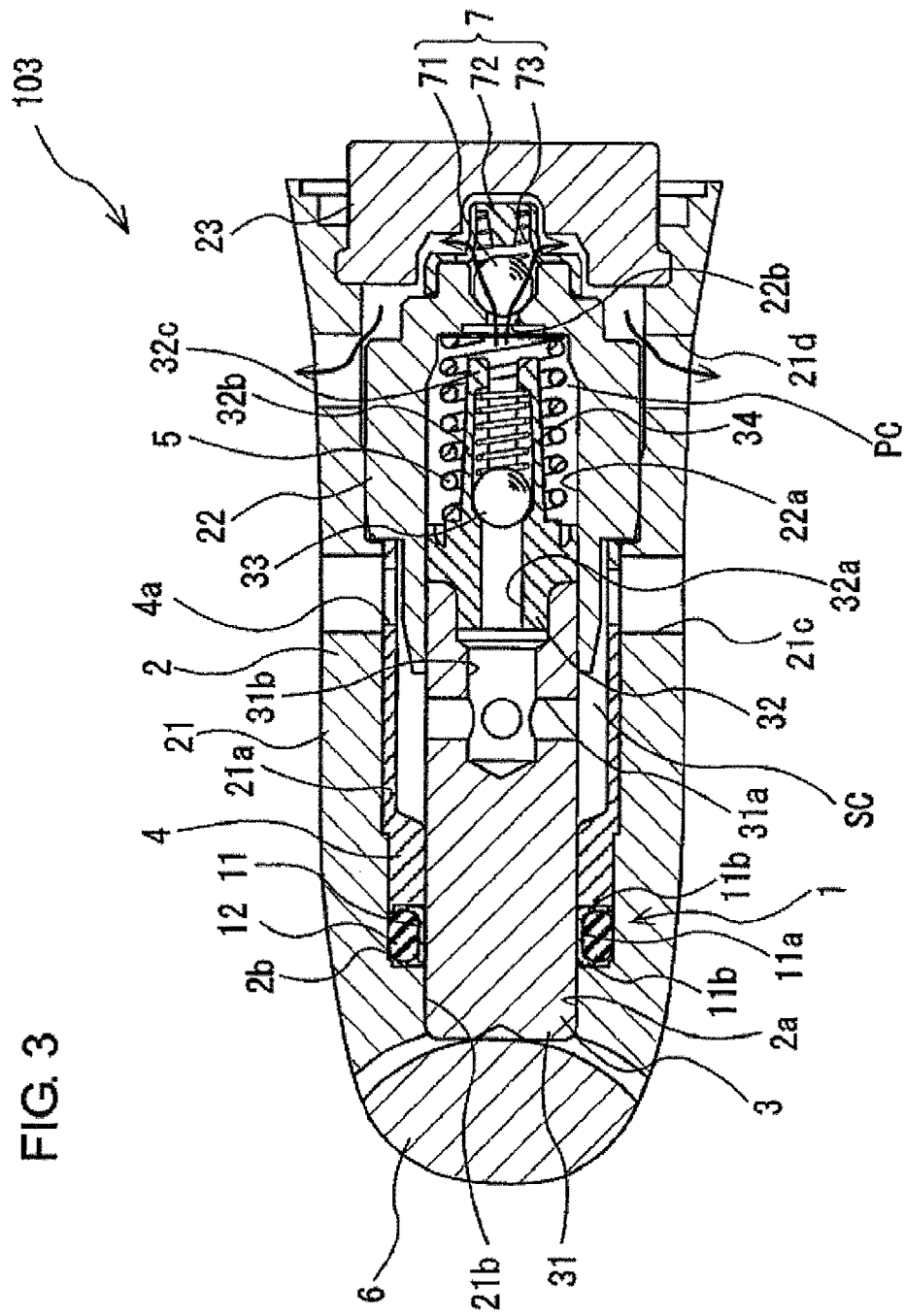
FIG. 3 is a fragmentary, longitudinal sectional view at a discharge stage of the piston pump shown in FIG. 1.

When the eccentric cam 6 is operated to retract its outer circumferential surface in the discharge state of the piston pump 103 shown in FIG. 3, the pump piston 3 is moved toward the left by being urged by the return spring 5. Thus, the volume in the pump chamber PC closed air-tightly increases to lower the hydraulic pressure in the pump chamber PC. Therefore, the valve body 33 goes way from the valve seat 32 to open, whereby brake fluid is introduced from the suction holes 21c through the supply chamber SC into the pump chamber PC (suction stage shown in FIG. 2).

When the eccentric cam 6 is rotated from the state shown in FIG. 2 to protrude the outer circumferential surface thereof, the pump piston 3 is moved toward the right against the urging force of the return spring 5. Thus, the pump chamber PC being closed air-tightly is compressed to increase the hydraulic pressure in the pump chamber PC. Thus, the discharge valve 7 is opened, whereby high-pressure brake fluid within the pump chamber PC is discharged outside from the discharge holes 21d (discharge stage shown in FIG. 3).

Figure 4:
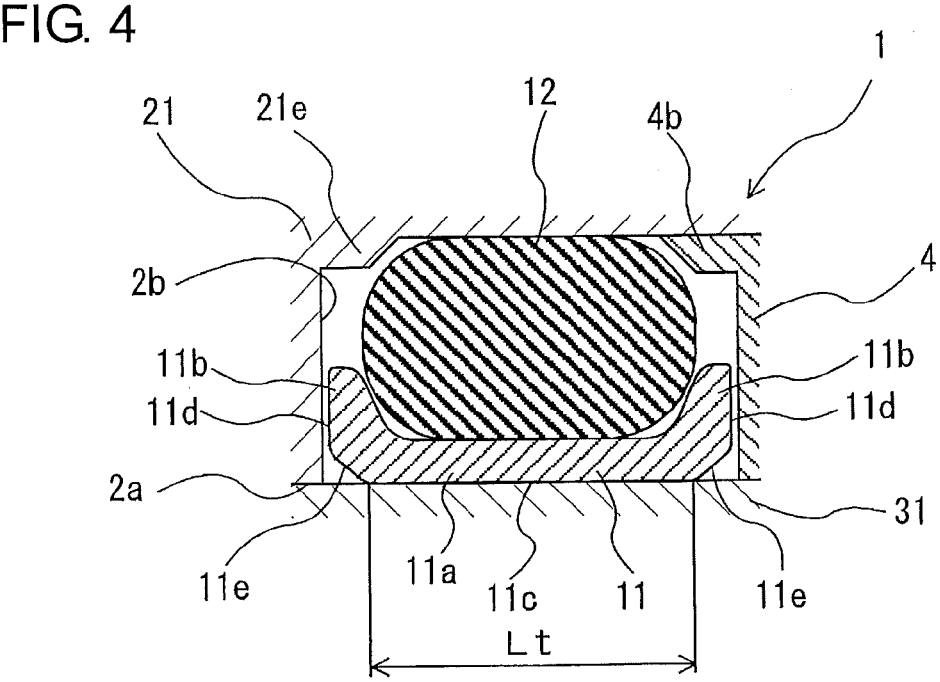
FIG. 4 is an enlarged sectional view of a sealing structure in a first embodiment.

Next, the foregoing sealing structure 1 will be described in detail. As shown in FIG. 4, by engaging the seal retainer 4 with the pump body 21, the annular groove 2b being an approximately rectangular shape in cross-section (i.e., the section taken across the circumferential direction of the annular groove 2b) is formed on the first pump cylinder bore 21b. The sealing structure 1 provided in the annular groove 2b is composed of a seal ring 11 (corresponding to the seal member in the claimed invention) formed to be a ring or annular shape and an annular O-ring 12 (corresponding to the pressing member in the claimed invention) arranged around (i.e., on the outer circumferential side of) the seal ring 11.

The seal ring 11 is formed as a single body by forming polytetrafluoroethylene (hereafter referred to as PTFE). However, the seal ring 11 is not necessarily limited to this material and may be replaced by any other material so far as it is a synthetic resin material being low in friction coefficient.

Figure 5:
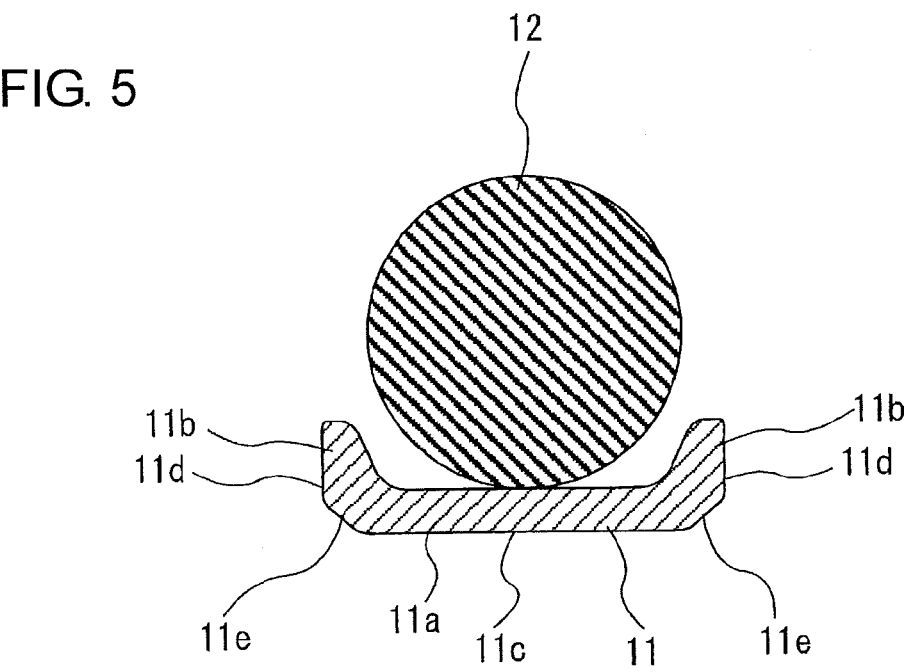
FIG. 5 is a sectional view showing a seal ring and an O-ring, composing the sealing structure shown in FIG. 4, in a state before fittings in an annular groove.
Figure 6:
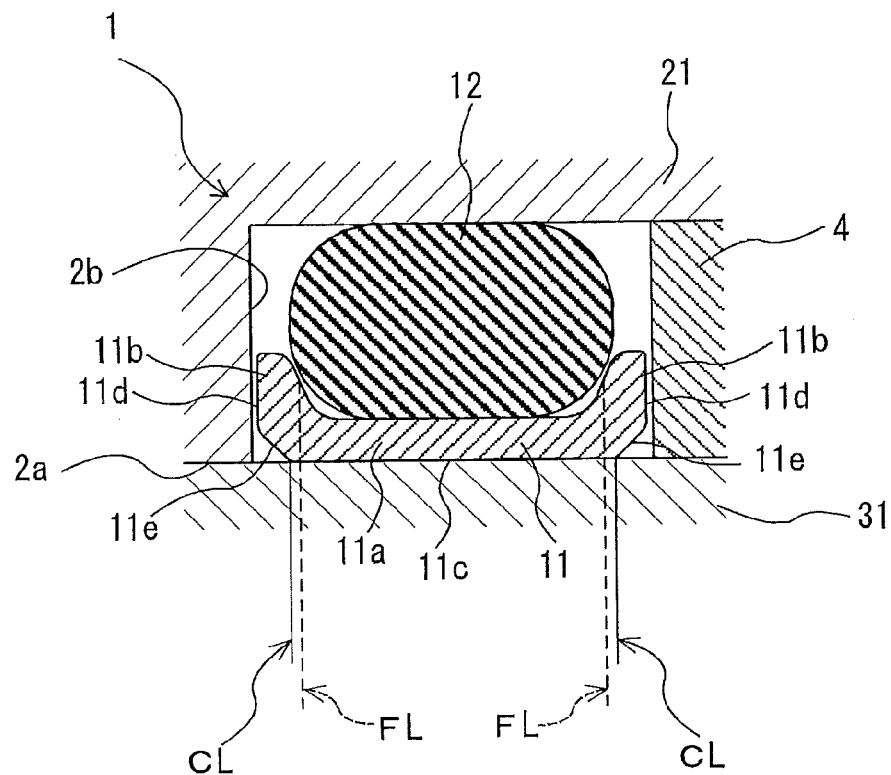
FIG. 6 is a sectional view for explaining the details in shape of the seal ring shown in FIG. 5.

As shown in FIGS. 4 through 6, the seal ring 11 is formed to have a cylindrical seal portion 11a and a pair of flange portions 11b (corresponding to the engaging portions in the claimed invention) which are respectively formed on axial opposite end portions of the seal portion 11a. The seal portion 11a extends in the axial direction, and its internal surface is formed as a seal surface 11c which fluid-tightly slides on the outer circumferential surface of the pump piston 3.

A seal length Lt (indicated in FIG. 4) of the seal ring 11 on the pump piston 3 is formed to be longer than the moving stroke Ls (indicated in FIG. 2) of the pump piston 3 relative to the pump cylinder 2a.

The flange portions 11b protrude radially outward so that the O-ring 12 is not detached from the seal ring 11 by coming off the same. The flange portion 11b may be formed on an end portion of the seal ring 11 on one side in the axial direction. On the seal ring 11, a pair of slant surfaces 11e (corresponding to slant surfaces in the claimed invention) are formed to connect an axial end surface 11d of each flange portion 11b with the seal surface 11c.

On the other hand, the O-ring 12 is formed as one body with a synthetic rubber material and is formed so that the cross-section represents a true circle in a free or unstressed state, as shown in FIG. 5. The O-ring 12 is fitted on the outer circumferential surface of the seal ring 11 in a somewhat expanded state to be located between the both flange portions 11b. In the state that the O-ring 12 is arranged in the annular groove 2b, it presses an axially center portion of the seal ring 11 radially inward toward the outer circumferential surface of the pump piston 3. Since the O-ring 12 is formed to be a true circle in the cross-section, the surface pressure (i.e., contact force or strength per area) at an axial center portion of the seal ring 11 can be made to be higher than the surface pressure at axial opposite end portions thereof as a result that the O-ring 12 presses the axial center portion of the seal ring 11.

Where the sealing structure 1 is to be fitted in the annular groove 2b, first, the seal ring 11 is fitted on the piston body 31. Then, the O-ring 12 is fitted on the outer circumferential surface of the seal ring 11 (i.e., between the both flange portions 11b) with itself being somewhat expanded in diameter. Further, the pump piston 3 with the seal retainer 4 engaged thereon and with the seal ring 11 fitted thereon is inserted into the first pump cylinder bore 21b of the pump body 21.

At this time, although the O-ring 12 is urged in a direction opposite to the inserting direction as its outer circumference slides on the internal bore 21a, the O-ring 12 is prevented by the flange portions 11b from coming off the seal ring 11. After the sealing structure 1 is fitted in the annular groove 2b, the O-ring 12 comes to fit with, or adapt to, the annular groove 2b and the seal ring 11, and thus, the O-ring 12 can become stable at the axial center position where it does not contact either of the flange portions 11b.

Alternatively, in fitting the sealing structure 1 in the annular groove 2b, the O-ring 12 may first be fitted on the outer circumference of the seal ring 11, which may then be fitted on the piston body 31 of the pump piston 3.

As shown in FIGS. 4 and 6, while the O-ring 12 in the state arranged in the annular groove 2b is elastically deformed in the axial direction, the distance between the flange portions 11b and other dimensions of the seal ring 11, the O-ring 12 and the like are determined so that substantially the O-ring 12 does not contact either of both flange portions 11b even when the pump piston 3 is either of being stationary and moving relative to the pump cylinder 2a. Thus, it does not occur that a load acts from the O-ring 12 to either of the flange portions 11b, and thus, such a load is prevented from influencing on the posture of the seal ring 11.

As shown in FIG. 4, the pump body 21 and the seal retainer 4 are respectively formed with restriction portions 21e and 4b which protrude from respective axial end surfaces of the annular groove 2b in the axial direction toward the O-ring 12. Each of the restriction portions 21e and 4b is formed to have a slight clearance between itself and the O-ring 12, so that the movement of the O-ring 12 in the axial direction is restricted regardless of whether the pump piston 3 is moving or not.

In FIG. 6, symbol CL indicates each of the positions in the axial direction of connection points where the seal surface 11c (internal surface) of the aforementioned seal ring 11 connects to the slant surfaces 11e. Further, symbol FL indicates each of axial positions of portions where the O-ring 12 would press either of the flange portions 11b if were brought into contact with either of the flange portions 11b. As understood from this, the connection points between the seal surface 11c of the aforementioned seal ring 11 and the slant surfaces 11e are located on the end sides (i.e., outer sides) in the axial direction beyond the portions where the O-ring 12 would press either of the flange portions 11b.

Accordingly, even if by any chance or by some rare accident, the O-ring 12 contacted either of the flange portions 11b to press the same toward the end portion side, it would not occur that the axial center portion of the seal surface 11c of the seal ring 11 floats up, and hence, it would not occur that the surface pressure (i.e., contact force or strength per area) at the axial center portion is lowered relative to the surfaces pressures at the axial opposite end portions. In FIG. 6, the restriction portions 21e, 4b formed on the pump body 21 and the seal retainer 4 are omitted for the sake of brevity in illustration.

(Second Embodiment)

Figure 7:
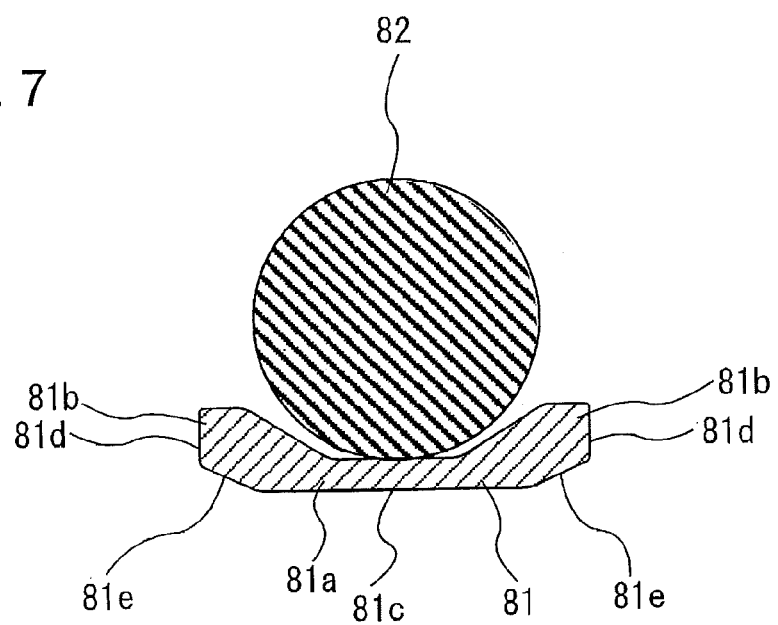
FIG. 7 is a sectional view showing a seal ring and an O-ring, composing a sealing structure in a second embodiment, in a state before fittings in an annular groove.

Next, a sealing structure 8 in a second embodiment according to the present invention will be described with reference to FIGS. 7 and 8. Like the aforementioned sealing structure 1, the sealing structure 8 is composed of a seal ring 81 made of the aforementioned PTFE and formed to a ring or annular shape and an O-ring 82 arranged on the outer circumferential side of the seal ring 81.

The seal ring 81 is formed with a cylindrical seal portion 81a and a pair of verge portion 81b which are respectively formed at opposite end portions in the axial direction of the seal portions 81a. The seal portion 81a axially extends, the internal surface of which is formed as a seal surface 81c to slide fluid-tightly on the pump piston 3.

The verge portions 81b protrude radially outward so that the O-ring 82 arranged on the outer circumferential side of the seal ring 81 does not come off, and are formed with a pair of slant surfaces 81e to connect an axial end surface 81d of each verge portion 81b to the seal surface 81c.

Figure 8:
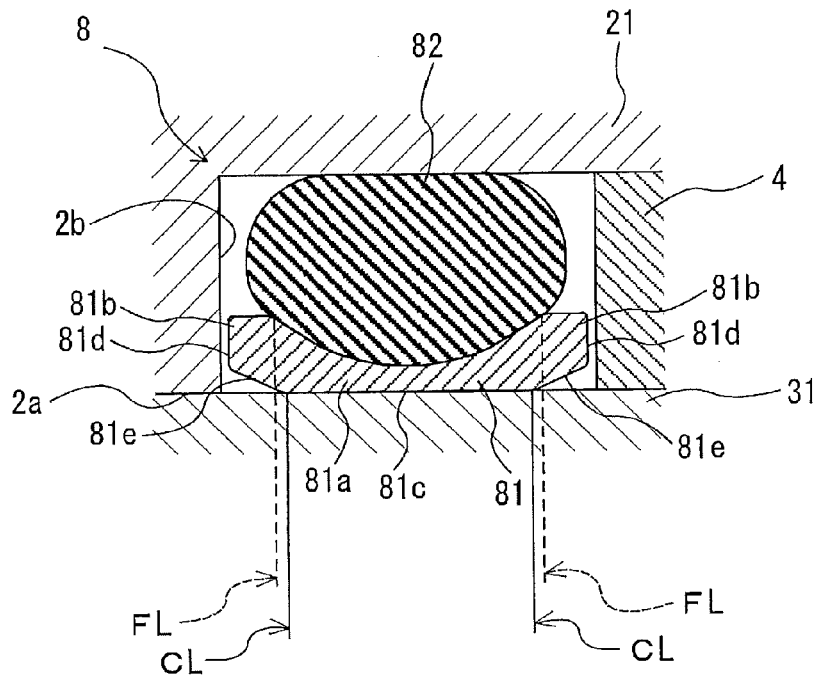
FIG. 8 is a sectional view for explaining the details in shape of the seal ring shown in FIG. 7.

In the seal ring 81, as shown in FIG. 8, connection points (each position in the axial direction is indicated by symbol CL in FIG. 8) between the seal surface 81c and the slant surfaces 81e are located at positions which are axially inner sides than portions (each position in the axial direction is indicated by symbol FL in FIG. 8) where the O-ring 82 presses either of the verge portions 81b.

Accordingly, where the O-ring 82 contacts either one of the verge portions 81b to press the same toward the end portion side, the lever action with a fulcrum at the connection point on the same side causes the opposite end portions in the axial direction of the seal surface 81c to be pressed radially inward and the center portion of the same to float up, and this results in lowering the surface pressure at the axial center portion of the seal ring 81 than the surface pressures at the axial opposite end portions thereof.

Figure 9:
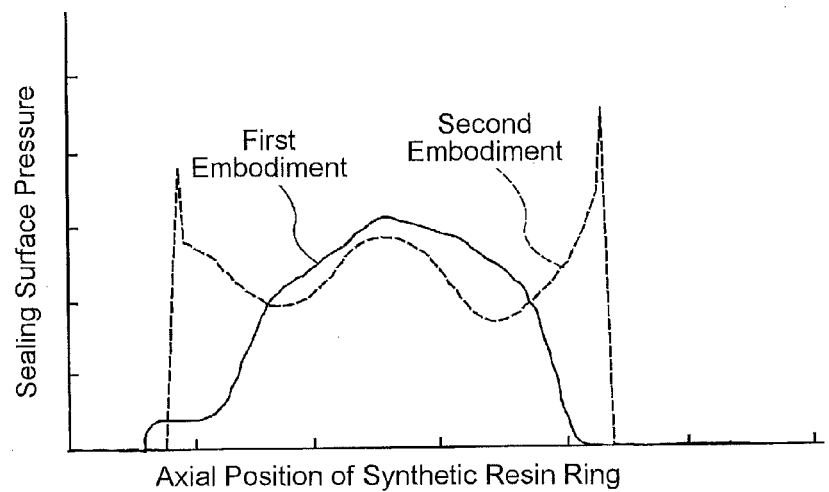
FIG. 9 is a graph showing the distribution of surface pressures which are generated by the respective sealing structures shown in FIGS. 6 and 8.

FIG. 9 is a graph showing the surface pressures which were measured by the inventors of the present invention as those which the respective seal rings 11, 81 of the sealing structures 1 and 8 in the foregoing first and second embodiments apply to the pump piston 3. FIG. 9 represents measured values when the piston pump 103 is at the suction stage, and the rightward direction in the axis of abscissas corresponds to the rightward direction in FIGS. 6 and 8.

As understood from the graph, in the sealing structure 8 in the second embodiment, since the verge portions 81b of the seal ring 81 are pressed by the O-ring 82, the surface pressures at the axial opposite end portions of the seal surface 81c are higher than the surface pressure at the axial center portion. In the sealing structure 1 in the first embodiment, on the contrary, since neither of the flange portions 11b of the seal ring 11 is urged by the O-ring 12, the surface pressure at the axial center portion of the seal surface 11c is remarkably higher than the surface pressures at the axial opposite end portions.

Figure 10:
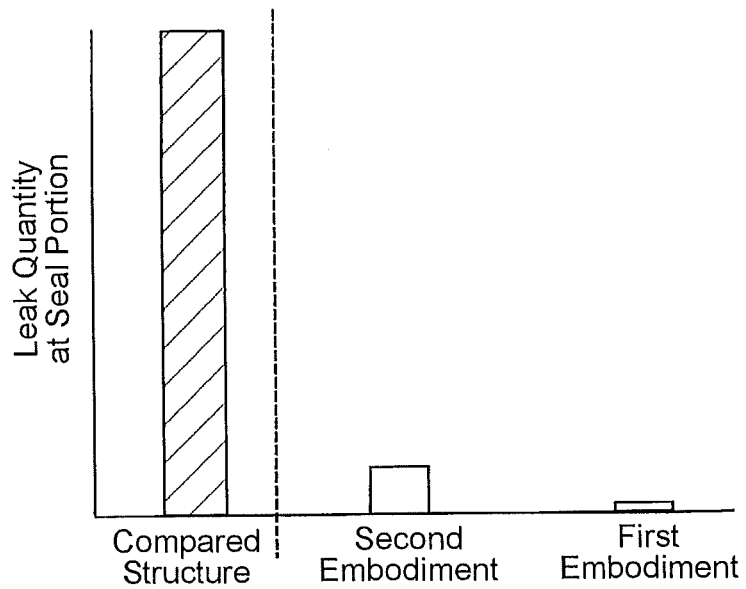
FIG. 10 is a graph showing the results of fluid leak tests on the respective sealing structures shown in FIGS. 6 and 8 as well as on a structure to be compared.

Further, the inventors of the present invention carried out leak tests on the sealing structures 1 and 8 in the first and second embodiments as well as on a sealing structure to be compared, which uses the O-ring 12 as a seal member without using the seal ring 11 made of the synthetic resin material, in the state that the piston pump is being operated. FIG. 10 is a graph representing leak quantities of brake fluid in the leak tests on the respective sealing structures. As understood from the graph, the leak quantity of brake fluid in the sealing structure 1 in the first embodiment is remarkably little in comparison with the leak quantity of brake fluid in the sealing structure to be compared. Further, although not being improved to the same level as the sealing structure 1 in the first embodiment, the leak quantity of brake fluid in the sealing structure 8 in the second embodiment is remarkably little in comparison with the leak quantity of brake fluid in the sealing structure to be compared.

In the first embodiment, the O-ring 12 urges the center portion in the axial direction of the seal ring 11 toward the outer circumferential surface of the pump piston 3. And, in the state that the pump piston 3 with the sealing structure 1 fitted in the annular groove 2b is either held stationary or being moved relative to the pump cylinder 2a, neither of the flange portions 11b substantially receives a load from the O-ring 12, and thus, the surface pressure at the axial center portion of the sealing ring 11 against the pump piston 3 is maintained higher than the surface pressures at the axial end portions thereof. Thus, the sealing function is performed at one place in the axial direction of the seal ring 11. Accordingly, regardless of whether the pump piston 3 is reciprocating or not, it does not occur that the fluid in the hydraulic pressure chamber is drawn out, so that the sealing performance can be enhanced.

Further, since the sealing function is performed at one place in the axial direction of the seal ring 11, the reciprocation movement of the pump piston 3 hardly changes the posture at the sealing portion, so that the surface pressure on the seal ring 11 can be prevented from being lowered by the cause of a change in the posture of the seal ring 11.

Further, in each of the first and second embodiments, since the seal ring 11, 81 is made of a synthetic resin material being smaller in frictional resistance, it is possible, without an apprehension that the seal ring 11, 81 surfers from being scraped or the like, to make large the interference of the seal ring 11, 81 on the pump piston 3 and to increase the surface pressure. Thus, it can be realized to extend the service life of the sealing structure 1, 8.

Further, since the seal ring 11, 81 is made of a synthetic resin material, there is no apprehension that the seal ring 11, 81 protrudes against the sliding surface, and hence, also in this point of view, it is possible to make large the interference of the seal ring 11, 81 on the pump piston 3.

Also in the first embodiment, because the connection points between the seal surface 11c being the internal surface of the seal ring 11 and the slant surfaces 11e are located at the positions on the axially outer sides than the portions where the O-ring 12 presses either of the flange portions 11b, it would not occur that an urging force acts to increase the surface pressures at the axial opposite end portions of the seal ring 11 and to lower the surface pressure at the axial center portion thereof even if the O-ring 12 were brought into contact with either of the flange portions 11b.

Further, since the sealing length of the seal ring 11 on the pump piston 3 is longer than the moving stroke of the pump piston 3 relative to the pump cylinder 2a, the posture of the seal ring 11 is hardly changed by the reciprocation movement of the pump piston 3, so that it is possible to prevent the surface pressure on the seal ring 11 from being lowered.

That is, while the reciprocation movement of the pump piston 3 causes the seal ring 11 only to receive a moving load directly from the pump piston 3, the O-ring 12 resists to stay within the annular groove 2b. Therefore, where the moving stroke of the pump piston 3 is long, the seal ring 11 is liable to become large in the change of its posture and to be lowered in the surface pressure thereon due to its movement relative to the O-ring 12.

To preclude this drawback, by making the moving stroke of the pump piston 3 relatively short, the change in the posture of the seal ring 11 can be prevented from becoming large, and the surface pressure on the seal ring 11 can be prevented from being lowered.

Further, because the pump body 21 and the seal retainer 4 which define the annular groove 2b in cooperation are formed with the restriction portions 21e, 4b which protrude from the end surfaces in the axial direction toward the O-ring 12 for restricting the movement in the axial direction of the O-ring 12, the movement in the axial direction of the O-ring 12 is restricted. Thus, the chances for the O-ring 12 to contact either of the flange portions 11b can further be decreased, so that it is possible to prevent the surface pressure on the seal ring 11 from being lowered.

Further, since the O-ring 12 is made of a rubber material and is formed as a ring member being round in section, it is possible in a simplified construction to press the axial center portion of the seal ring 11 radially inward.

Further, since the sealing structure 1 is provided between the pump piston 3 and the first pump cylinder bore 21b and since the supply chamber SC is sealed from the exterior to which the left end side of the pump piston 3 is exposed, it does not occur in spite of the reciprocation movement of the pump piston 3 that the fluid in the supply chamber SC is drawn out, and therefore, it is possible to enhance the performance of sealing the supply chamber SC against the exterior.

(Modified Forms of the Embodiments)

Figure 11:
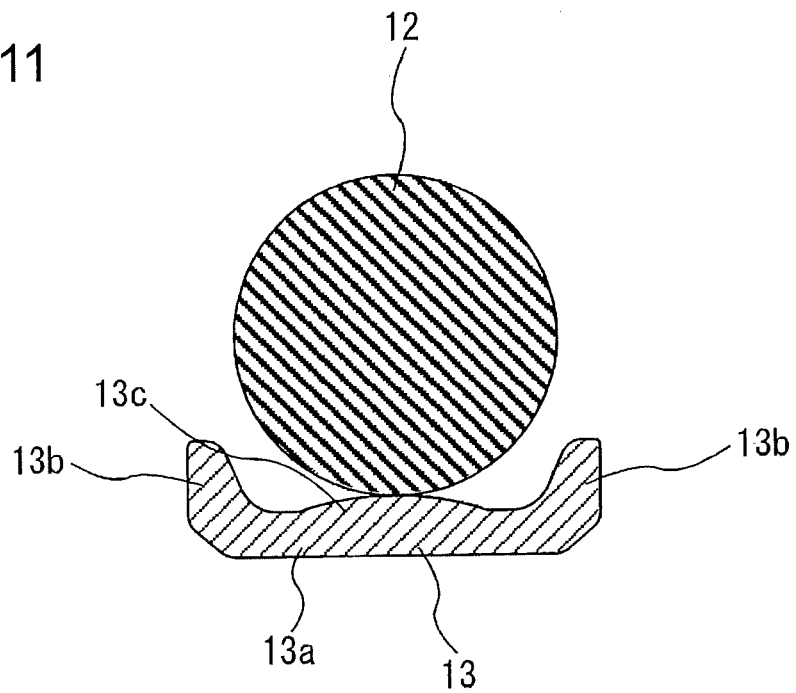
FIG. 11 is a sectional view showing a seal ring and an O-ring in a first modified form of the embodiment in a state before fittings in an annular groove.

Hereafter, first to fourth modified forms of the aforementioned embodiment will be described with reference to FIGS. 11 through 14. FIG. 11 shows a first modified form of the embodiment, and a sealing structure in the modified form includes a seal ring 13 formed to a shape different from that in the aforementioned sealing structure 1 and an O-ring like that in the sealing structure 1.

The seal ring 13 is made of the aforementioned PTFE and is formed with a seal portion 13a which slides on the outer circumferential surface of the pump piston 3 at the internal surface thereof, and a pair of flange portions 13b which are formed at the axial opposite end portions to protrude radially outward. Unlike that in the sealing structure 1, the seal portion 13a is formed with a contact portion 13c whose outer circumferential surface rises radially outward, at its center portion in the axial direction where it contacts the O-ring 12. Other constructions are the same as those in the sealing structure 1, and description of such other constructions will be omitted for the sake of brevity.

According to this modified form, since the outer circumferential surface of the seal ring 13 rises radially outward at the center portion in the axial direction, it is possible regardless of the section shape of the O-ring 12 to press the axial center portion of the seal ring 13 radially inward in the state that the same is fitted in the annular groove 2b.

Figure 12:
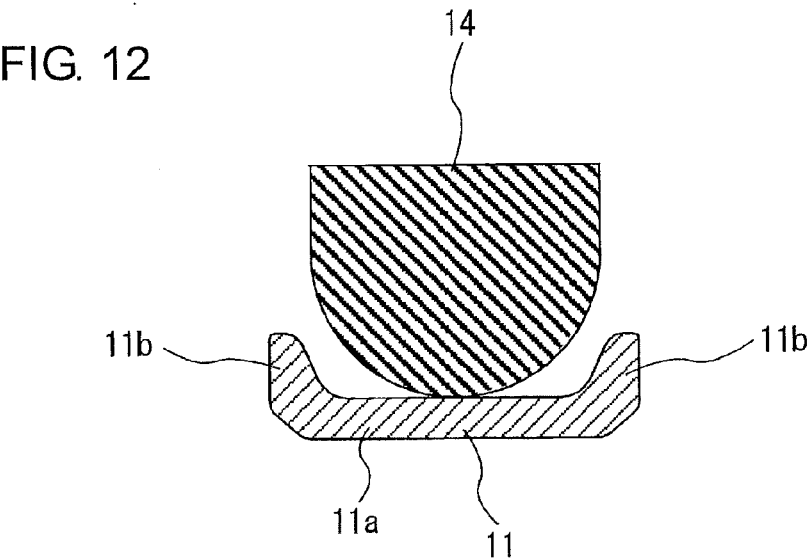
FIG. 12 is a sectional view showing a seal ring and a ring member in a second modified form of the embodiment in a state before fittings in an annular groove.

FIG. 12 shows a second modified form of the embodiment, and a sealing structure in this modified form includes a seal ring 11 similar to that in the foregoing sealing structure 1 and a ring member 14 which is made of a synthetic rubber material to be formed to a shape different from the O-ring 12 in the foregoing sealing structure 1. The ring member 14 has a section shape which is formed to be an arc on the inner circumferential side and to be flat on the outer circumferential side. Other constructions are the same as those in the foregoing sealing structure 1, and description of such other constructions will be omitted for the sake of brevity.

According to this modified form, since the ring member 14 is formed to be the arc shape on the inner circumferential side to press the seal ring 11 at the center portion thereof in the axial direction, it is possible to increase the surface pressure at the axial center portion of the seal ring 11. Further, because of being formed to be flat on the outer circumferential side, the ring member 14 can be received stably in the annular groove 2b.

Figure 13:
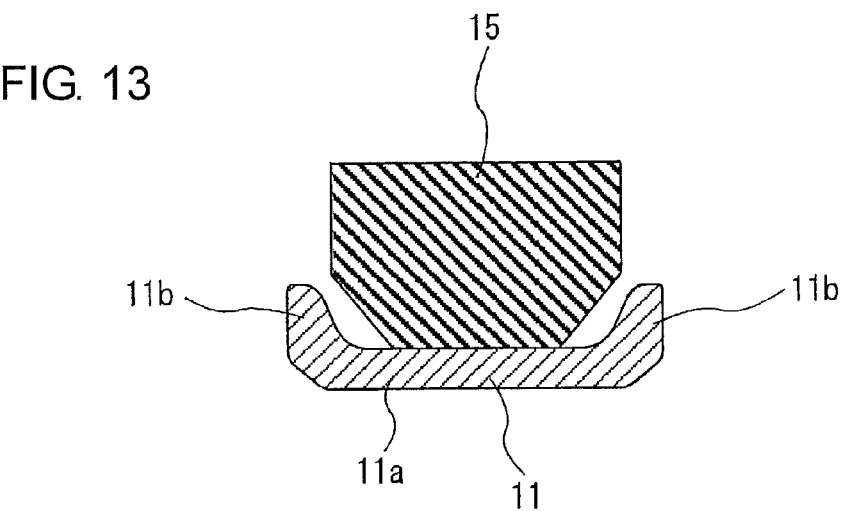
FIG. 13 is a sectional view showing a seal ring and a ring member in a third modified form of the embodiment in a state before fittings in an annular groove.

FIG. 13 shows a third modified form of the embodiment, and a sealing structure in this modified form includes a seal ring 11 similar to that in the foregoing sealing structure 1 and a ring member 15 which is made of a synthetic rubber material to be formed to a shape different from the O-ring 12 in the foregoing sealing structure 1. The ring member 15 has a section shape which is formed to an inverted trapezoidal shape or a trapezoidal shape turned upside down in FIG. 13 on the inner circumferential side and to be flat on the outer circumferential side. Other constructions are the same as those in the foregoing sealing structure 1, and description of such other constructions will be omitted for the sake of brevity.

According to this modified form, since the ring member 15 is formed to be a trapezoidal shape on the inner circumferential side to press the center portion only in the axial direction of the seal ring 11, it is possible to increase the surface pressure at the axial center portion of the seal ring 11. Further, because of being formed to be flat on the outer circumferential side, the ring member 15 can be received stably in the annular groove 2b.

Figure 14:
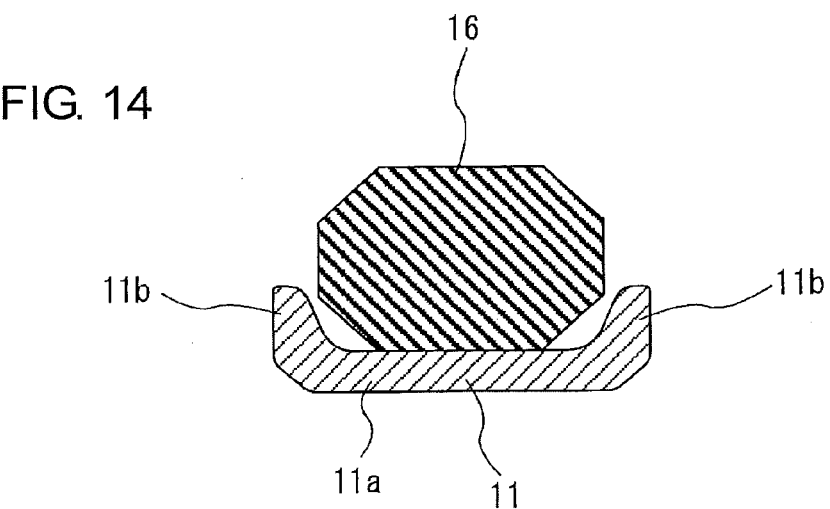
FIG. 14 is a sectional view showing a seal ring and a ring member in a fourth modified form of the embodiment in a state before fittings in an annular groove.

FIG. 14 shows a fourth modified form of the embodiment, and a sealing structure in this modified form includes a seal ring 11 similar to that in the foregoing sealing structure 1 and a ring member 16 which is made of a synthetic rubber material to be formed to a shape different from the O-ring 12 in the foregoing sealing structure 1. The ring member 16 has a section shape which is formed to an inverted trapezoidal shape or a trapezoidal shape turned upside down in FIG. 14 on the inner circumferential side and to be a trapezoidal shape standing correctly on the outer circumferential side. Other constructions are the same as those in the foregoing sealing structure 1, and description of such other constructions will be omitted for the sake of brevity.

According to this modified form, since the ring member 16 is formed to be a trapezoidal shape on the inner circumferential side to press the center portion only in the axial direction of the seal ring 11, it is possible to increase the surface pressure at the axial center portion of the seal ring 11. Further, because of being formed to be a trapezoidal shape also on the outer circumferential side, the ring member 16 can be received stably in the annular groove 2b.

(Other Embodiments)

The preset invention is not limited to the foregoing embodiments and the modified forms thereof and can further be practiced in the forms of the following other embodiments.

The piston pump in the present invention is applicable to other devices such as an engine control device, a transmission control device and the like than the brake hydraulic pressure control device.

The sealing structure in the present invention can be applied to a piston pump of the construction that a feedback chamber is provided to be located on the side opposite to a pump chamber in the axial direction with a supply chamber arranged therebetween, as disclosed in JP2008-208788 A.

Figure 15:
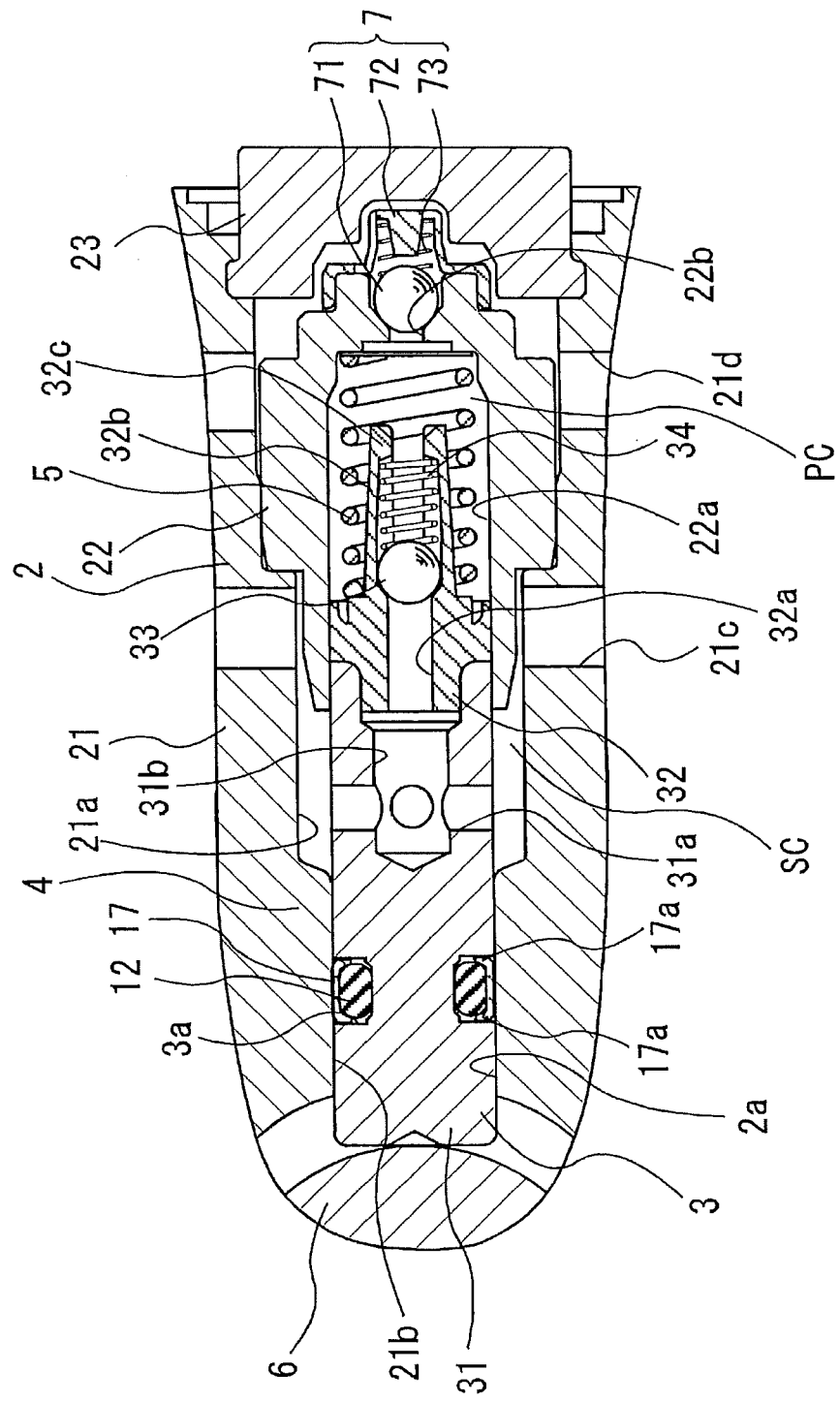
FIG. 15 is a fragmentary, longitudinal sectional view of a piston pump incorporating a sealing structure for a piston pump in another embodiment according to the present invention.

As shown in FIG. 15, a sealing structure according to the present invention may take another configuration that an annular groove 3a is formed on the outer circumferential surface of the piston pump 3, that a seal ring 17 is received in the annular groove 3a to contact the pump cylinder 2a fluid-tightly at the outer circumferential surface thereof, and that the O-ring 12 is provided on the inner circumferential side of the seal ring 17. In this embodiment, in inserting into the pump cylinder 2a the pump piston 3 with the seal ring 17 and the O-ring 12 fitted thereon, it may take place that the seal ring 17 comes off to separate from the O-ring 12 due to sliding on the pump cylinder 2a. In order to prevent this, the seal ring 17 is formed with a pair of flange portions 17a which protrude radially inward at the end portions in the axial direction. As a matter of course, also in this embodiment, the distance between the flange portions 17b and other dimensions of the seal ring 17, the O-ring 12 and the like are determined so that substantially the O-ring 12 does not contact either of both flange portions 17b when the pump piston 3 is either of being stationary and moving relative to the pump cylinder 2a.

Various features and many of the attendant advantages in the foregoing embodiments and the modified forms thereof will be summarized as follows:

In the sealing structure 1 for a piston in each of the foregoing embodiments typically shown in FIGS. 4, 6 and 15, the pressing member (O-ring) 12 urges the center portion in the axial direction of the seal member (seal ring) 11, 17 toward the cylinder (pump cylinder) 2a or the outer circumferential surface of the piston (pump piston) 3. The engaging portion 11b, 17a are configured not receive a load from the pressing member 12 in the state that the pressing member 12 and the seal member 11, 17 are fitted in the annular groove 2b, 3a, and the surface pressure which the seal member 11, 17 applies to the cylinder 2a or the outer circumferential surface of the piston 3 at the axial center portion thereof is higher than the surface pressures which the seal member 11, 17 applies to the cylinder 2a or the outer circumferential surface of the piston 3 at the axial end portions thereof. Thus, the sealing function is performed at one place in the axial direction of the seal member 11, 17. Accordingly, regardless of whether the piston 3 is reciprocating or not, it does not occur that the fluid in the hydraulic pressure chamber (suction chamber) SC is drawn out, so that the sealing performance can be enhanced.

Further, since the seal member 11, 17 performs the sealing function at the center portion thereof in the axial direction, the reciprocation movement of the piston 3 hardly changes the posture at the sealing portion, so that the surface pressure on the seal member 11, 17 can be prevented from being lowered by the cause of a change in the posture of the seal member 11, 17. That is, the sealing structure 1 of the present invention in the first aspect is free of the pumping phenomenon which occurs in the prior art pump as disclosed in the aforementioned Japanese patent, and can be further improved in the sealing performance.

Further, with the construction in the embodiments, since the seal member 11, 17 is made of a synthetic resin material being smaller in frictional resistance, it is possible to make large an interference of the seal member 11, 17 on the cylinder 2a or the piston 3 and to increase the surface pressure, without an apprehension that the seal member 11, 17 surfers from being scraped or the like. Thus, it can be realized to extend the service life of the sealing structure 1.

Also in the sealing structure 1 for a piston in the foregoing first embodiment typically shown in FIG. 6, the connection points between the seal surface 11c of the seal member 11 and the slant surfaces 11e are located on the end sides in the axial direction (i.e., outer sides) beyond the portions where the pressing member 12 would press either of the engaging portions 11b if were brought into contact with the same. Therefore, even if the pressing member 12 were brought into contact with either of the engaging portions 11b, an urging force would not act to increase the surface pressures at the axial opposite end portions of the seal member 11 and to lower the surface pressure at the axial center portion of the seal member 11.

Also in the sealing structure 1 for a piston in the foregoing embodiments, as typically shown in FIGS. 2 and 4, since the seal length Lt (refer to FIG. 4) of the seal member 11, 17 on the cylinder 2a or the outer circumferential surface of the piston 3 is longer than the moving stroke of the piston 3 relative to the cylinder 2a, the posture of the seal member 11, 17 is hardly changed by the reciprocation movement of the piston 3, so that it is possible to prevent the surface pressure on the seal member 11, 17 from being lowered.

That is, while the reciprocation movement of the piston 3 causes the seal member 11, 17 to receive a moving load directly from the cylinder 2a or the piston 3, the pressing member 12 resists to stay within the annular groove 2b, 3a. Therefore, if the moving stroke of the piston 3 were long, the seal member 11, 17 would be liable to become large in the change of its posture and to be lowered in the surface pressure thereon due to its movement relative to the pressing member 12.

To preclude this drawback, by making the moving stroke of the piston 3 relatively short, the change in the posture of the seal member 11, 17 can be prevented from becoming large, and the surface pressure on the seal member 11, 17 can be prevented from being lowered.

Also in the sealing structure 1 for a piston in the foregoing first embodiment typically shown in FIG. 4, since in the annular groove 2b, the restriction portions 21e, 4b are formed to protrude from the axial end surfaces toward the pressing member 12 for restricting the movement in the axial direction of the pressing member 12, the movement in the axial direction of the pressing member 12 is restricted. Thus, the chances for the pressing member 12 to contact either of the engaging portions 11b can further be decreased, so that it is possible to prevent the surface pressure on the seal member 11 from being lowered.

Also in the sealing structure 1 for a piston in the foregoing first embodiment typically shown in FIG. 5, since the pressing member 12 is made of a rubber material and is formed as a ring member being circular or round in section, it is possible in a simplified construction to press the axial center portion of the seal member 11 radially.

Also in the sealing structure for a piston in the foregoing first modified form shown in FIG. 11, since the portion of the seal member 13 which portion is located at the center in the axial direction to contact the pressing member 12 rises radially toward the pressing member 12, it is possible regardless of the section shape of the pressing member 12 to press the axial center portion of the seal member 13 against the cylinder 2a or the piston 3 in the state that the sealing structure is fitted in the annular groove 2b, 3a.

In the piston pump in the first embodiment typically shown FIG. 2 or in the other embodiment shown in FIG. 15, the annular groove 2b, 3a which is located between the supply chamber SC and the exterior to which the pump piston 3 is exposed is formed on one of the pump cylinder 2a and the outer circumferential surface of the pump piston 3, and the sealing structure 1, 8 in any one of the foregoing first and second embodiments shown in FIGS. 6 and 8 and the modified forms shown in FIGS. 11-14 is provided in the annular groove 2a, 3a. Thus, regardless of whether the pump piston 3 is reciprocating or not, it does not occur that the fluid in the supply chamber SC is drawn out to the exterior, so that the performance for sealing the supply chamber SC against the exterior can be enhanced.

In the brake hydraulic pressure control device 100 in the first embodiment shown in FIG. 1, the piston pump 103 is provided with the sealing structure 1 which is arranged in the annular groove 2b, 3a formed on one of the cylinder 2a and the outer circumferential surface of the piston 3, and the sealing structure 1 comprises the seal member 11, 81, 13, 17 made of a synthetic resin material to an annular shape and contacts the other of the cylinder 2a and the outer circumferential surface of the piston 3 at the seal surface 11c, 81c formed on the inner or outer circumferential surface thereof for fluid-tightly sealing the fitting portion between the piston 3 and the cylinder 2a and the pressing member 12, 82, 14, 15, 16 arranged on the outer or inner circumferential side of the seal member 11, 81, 13, 17 for urging the axial center portion of the seal member 11, 81, 13, 17 toward the cylinder 2a or the outer circumferential surface of the piston 3. Therefore, regardless of whether the piston 3 is reciprocating or not, it does not take place that the seal member 11, 81, 13, 17 surfers from being scraped or the like, and hence, it can be realized to extend the service life of the sealing structure 1.

Further, since the seal member 11, 81, 13, 17 made of a synthetic resin material is urged by the pressing member 12, 82, 14, 15, 16 to be pressed properly on the piston 3 or the cylinder 2a, it is possible to remarkably decrease the leak quantity of brake fluid.

Also in the brake hydraulic pressure control device 100 in the first embodiment shown in FIG. 1, since the sealing structure 1 is provided to partition the suction region of the piston pump 103 from the atmospheric region, it is possible to decrease the leak of brake fluid from the suction region of the piston pump 103 to the atmospheric region.

Also in the brake hydraulic pressure control device 100 in the first embodiment shown in FIG. 1, since the sealing structure 1 of any one of the characters set forth above is incorporated, the same effects as described with respect to the sealing structure 1 can be achieved in the brake hydraulic pressure control device 100.

Obviously, numerous other modifications and variations of the present invention are possible in light of the above teachings. It is therefore to be understood that within the scope of the appended claims, the present invention may be practiced otherwise than as specifically described herein.

What is claimed is:

1. A sealing structure for a piston which is reciprocatable in an axial direction in a cylinder extending in the axial direction with an annular groove formed on one of the cylinder and an outer circumferential surface of the piston and bounded by two oppositely disposed and spaced apart interior walls, the structure comprising:

a seal member made of a synthetic resin material to an annular shape and fitted in the annular groove so that a seal surface formed on an inner or outer circumferential surface thereof contacts the other of the cylinder and the outer circumferential surface of the piston for fluid-tightly sealing a fitting portion between the piston and the cylinder;

a pressing member arranged on an outer or inner circumferential side of the seal member in the annular groove for urging a center portion in the axial direction of the seal member toward the cylinder or the outer circumferential surface of the piston; and an engaging portion formed on at least one end portion in the axial direction of the seal member and radially protruding for preventing the seal member from separating from the pressing member in assembling the pressing member and the seal member;

wherein:

the engaging portion is configured not to receive a load from the pressing member in the state that the pressing member and the seal member are fitted in the annular groove;

a surface pressure which the seal member applies to the cylinder or the outer circumferential surface of the piston at an axial center portion thereof is higher than surface pressures which the seal member applies to the cylinder or the outer circumferential surface of the piston at axial end portions thereof; and the seal member possesses two oppositely disposed axial end surfaces, each axial end surface of the seal member facing toward, and being spaced apart from, a respective one of the two interior walls bounding the annular groove;

wherein the seal member is provided with a slant surface which connects the seal surface with the axial end surface thereof; and wherein a connection point between the seal surface and the slant surface is located on an end portion side in the axial direction beyond a portion where the pressing member presses the engaging portion when brought into contact with the engaging portion.

2. The sealing structure as set forth in claim 1, wherein the engaging portion is formed on each of axial end portions of the seal member.

3. The sealing structure as set forth in claim 1, wherein a sealing length through which the seal member seals the cylinder or the outer circumferential surface of the piston is set to be longer than a moving stroke of the piston relative to the cylinder.

4. The sealing structure as set forth in claim 1, further comprising:

first and second restriction portions protruding from a respective one of the two interior walls of the annular groove for restricting movement of the pressing member in the axial direction, wherein each restriction portion is spaced apart from the pressing member when the pressing member is received in the annular groove.

5. The sealing structure as set forth in claim 1, wherein the pressing member comprises a ring member which is made of a rubber material to a shape being circular in section.

6. The sealing structure as set forth in claim 1, wherein a center portion in the axial direction of the seal member radially rises toward the pressing member to contact the pressing member.

7. The sealing structure as set forth in claim 1, wherein the pressing member comprises a ring member which is made of a rubber material and which takes in section one of an arc shape and a trapezoidal shape at at least a portion pressing the seal member to press the center portion in the axial direction of the seal member.

8. The sealing structure as set forth in claim 7, wherein the ring member takes in section one of a flat shape and a trapezoidal shape at at least a portion opposite radially to the portion pressing the seal member.

9. A piston pump comprising:

a housing formed with a pump cylinder extending in an axial direction;

a pump piston fluid-tightly reciprocatable in the pump cylinder;

a pump chamber formed between one end portion of the pump piston and a bottom portion of the pump cylinder and communicating with a discharge port for hydraulic pressure;

a supply chamber formed between an outer circumference of the pump piston and the housing and communicating with a suction port for hydraulic pressure;

a pump valve provided on the pump piston for being usually in a closed state but for being brought by hydraulic pressure from the supply chamber into an open state to make the pump chamber communicate with the supply chamber;

an eccentric cam contacting the other end portion of the pump piston for moving the pump piston toward the pump chamber when rotated;

an urging member engaged with the pump piston for urging the pump piston toward the eccentric cam;

an annular groove located between the supply chamber and an exterior to which the other end portion of the pump piston is exposed, and provided on one of the pump cylinder and the outer circumference of the pump piston; and the sealing structure configured as set forth in claim 1 and provided in the annular groove.

10. A brake hydraulic pressure control device having:

a plurality of control valves for regulating hydraulic pressure supplied to at least one brake wheel cylinder for at least one wheel; and a piston pump for boosting hydraulic pressure supplied to the at least one brake wheel cylinder, wherein the piston pump comprises:

a cylinder extending in an axial direction;

a piston reciprocatable in the axial direction in the cylinder;

an annular groove formed on one of the cylinder and an outer circumferential surface of the piston and bounded by two oppositely disposed and spaced apart interior walls; and a sealing structure, wherein the sealing structure for a piston as set forth in claim 1 is incorporated as the sealing structure.

11. The brake hydraulic pressure control device as set forth in claim 10, wherein the sealing structure is provided for partitioning a suction region of the piston pump from the atmospheric region.

12. The brake hydraulic pressure control device of claim 10, further comprising first and second restriction portions protruding from a respective one of the two interior walls of the annular groove for restricting axial movement of the pressing member, wherein each restriction portion is spaced apart from the pressing member when the pressing member is received in the annular groove.

13. A sealing structure for a piston which is axially reciprocatable in a cylinder extending in an axial direction with an annular groove formed in one of the cylinder and an outer circumferential surface of the piston and bounded by two oppositely disposed and spaced apart interior walls, the sealing structure comprising:

a seal member possessing an annular shape, a circumferential surface and two oppositely disposed axial end surfaces, the circumferential surface of the seal member contacting one of the cylinder and the outer circumferential surface of the piston so that a fluid-tight seal exists between the seal member and the one of the cylinder and the outer circumferential surface of the piston contacting the seal member, the seal member being made of a synthetic resin, and each axial end surface of the seal member facing toward, and being spaced apart from, a respective one of the two interior walls bounding the annular groove;

a pressing member positioned in the annular groove and bordering the seal member, the pressing member being configured to apply a force urging the seal member toward the one of the cylinder and the outer circumferential surface of the piston contacting the seal member so that the seal member applies a surface pressure to the one of the cylinder and the outer circumferential surface of the piston contacting the seal member;

the surface pressure applied by an axially central portion of the seal member is higher than the surface pressure applied by axial end portions of the seal member;

the seal member possesses radially protruding first and second engaging portions to prevent the pressing member from sliding off the seal member during assembly of the sealing structure;

the seal member possesses first and second slant surfaces, each slant surface being angled relative to the circumferential surface of the seal member and extending between the circumferential surface of the seal member and one of the axial end surfaces of the seal member;

the pressing member is contactable with the first and second engaging portions at respective first and second contact points during axial reciprocation of the piston in the cylinder;

the first contact point is closer to the axially central portion of the seal member than where the first slant surface of the seal member intersects the circumferential surface of the seal member; and wherein the second contact point is closer to the axially central portion of the seal member than where the second slant surface of the seal member intersects the circumferential surface of the seal member.

14. The sealing structure of claim 13, wherein the sealing structure further comprises first and second restriction portions protruding from a respective one of the two interior walls of the annular groove for restricting axial movement of the pressing member, wherein each restriction portion is spaced apart from the pressing member when the pressing member is received in the annular groove.

* * * * *